United States Patent [19]
Hatch

[11] Patent Number: 5,887,881
[45] Date of Patent: Mar. 30, 1999

[54] LEAF SPRING ATTACHMENT MEMBER

[75] Inventor: Allen Hatch, Chicago, Ill.

[73] Assignee: The Boler Company., Itasca, Ill.

[21] Appl. No.: 909,244

[22] Filed: Aug. 11, 1997

[51] Int. Cl.$^6$ ...................................................... B62D 21/11
[52] U.S. Cl. .................................... 280/124.175; 267/269; 280/124.163; 280/124.165; 280/124.17; 403/220
[58] Field of Search ...................... 280/124.162, 124.157, 280/124.163, 124.164, 124.165, 124.17, 124.175, 124.177; 267/260, 262, 269; 403/220, 291

[56] References Cited

U.S. PATENT DOCUMENTS

| 256,284 | 4/1882 | Buckland . |
| 2,126,086 | 8/1938 | Banks . |

FOREIGN PATENT DOCUMENTS

| 1580122 | 10/1970 | Germany | 267/269 |
| 2758721 | 7/1979 | Germany | 267/262 |
| 60-45409 | 3/1985 | Japan | 267/262 |
| 686725 | 1/1953 | United Kingdom | 267/262 |

*Primary Examiner*—Eric D. Culbreth
*Attorney, Agent, or Firm*—Lockwood, Alex, FitzGibbon & Cummings

[57] ABSTRACT

A suspension system for supporting a frame member on one side of a vehicle chassis on the adjacent end of an axle includes first and second frame brackets, a single-leaf leaf spring, a leaf spring attachment member and a wear plate. The first and second frame brackets are mounted to the frame member on the outer sides thereof. The front end of the single-leaf leaf spring is pivotally connected to the frame member at the first frame bracket and the rear end thereof is connected to the frame member at the second frame bracket. The leaf spring attachment member mounts to the rear end of the leaf spring and connects the leaf spring with the second frame bracket. The leaf spring attachment member includes an arcuate upper surface and a bottom surface. A rebound bolt connects the rear end of the leaf spring and the leaf spring attachment member with the second frame bracket and restricts the movement of the leaf spring to a controlled range. A wear plate is connected to the second frame bracket and is associated with the leaf spring attachment member.

23 Claims, 3 Drawing Sheets

LEAF SPRING ATTACHMENT MEMBER

BACKGROUND OF THE INVENTION

This invention relates to innovations and improvements in axle suspensions for trucks and trailers and in certain components of such suspensions. More particularly, the invention relates to such suspensions wherein a single-leaf leaf spring has an eye formation at one end by which it is pivotally connected to a mounting bracket on one side of a chassis side rail or frame member while the opposite end of the single-leaf leaf spring is connected to a mounting bracket on the frame member by a new and improved attachment part which permits an acceptable amount of play or relative movement between that end of the spring and the frame mounting bracket while at the same time anchoring that end of the spring to the frame mounting bracket in the event the pivotal connection at the opposite end becomes broken or unattached. Intermediate its opposite ends the single-leaf leaf spring is mounted on the adjacent end of the axle and supports an air cushion or air bag which provides a substantial portion of the support for the chassis.

One advantage of the suspension of this invention is the omission of an additional leaf having a so-called "military wrap" formation that embraces the spring eye end of the single-leaf leaf spring. This omission is permissible since even with the spring eye freed or detached from its bracket, the opposite end of the single-leaf leaf spring is connected to the frame mounting bracket in a sufficiently secure manner so that the end of the axle on which the single-leaf leaf spring is mounted will not become loose and uncontrolled while the vehicle is brought to a safe stop.

In view of the foregoing, it is a principal object of the present invention to provide a novel component part of a suspension system whereby the fore-and-aft movement of the movable end of its attached leaf spring is reduced to a controlled range.

It is a further object of the present invention to provide a novel component part of a suspension system which serves as a relatively consistent contact surface for its attached leaf spring.

It is a further object of the present invention to provide a novel component part of a suspension system which mounts to a leaf spring and serves as a relatively consistent contact surface therefor.

It is yet another object of the present invention to provide a novel component part of a suspension system which serves as an additional safety mechanism for a leaf spring.

It is still another object of the present invention to provide a novel component part of a suspension system which enables its attached leaf spring to be free of unnecessary hardware components.

It is yet another object of the present invention to provide a novel component part of a suspension system which enables its attached leaf spring to be free of a military leaf wrap.

It is still another object of the present invention to provide a novel component part of a suspension system which enables the system to include a single-leaf leaf spring on each side of the vehicle for supporting that side of the vehicle axle.

It is yet another object of the present invention to provide a novel component part of a suspension system which enables the suspension system to comprise a lighter-weight suspension system.

It is finally another object of the present invention to provide a novel component part of a suspension system which reduces the manufacturing costs of the system by eliminating the need for otherwise necessary parts thereof.

These and other objects of the invention will be apparent to those skilled in the art from the following detailed description of the preferred embodiment taken in conjunction with the accompanying drawings wherein:

DETAILED DESCRIPTION OF THE PREFERRED EMBODIMENT

Figure 1:
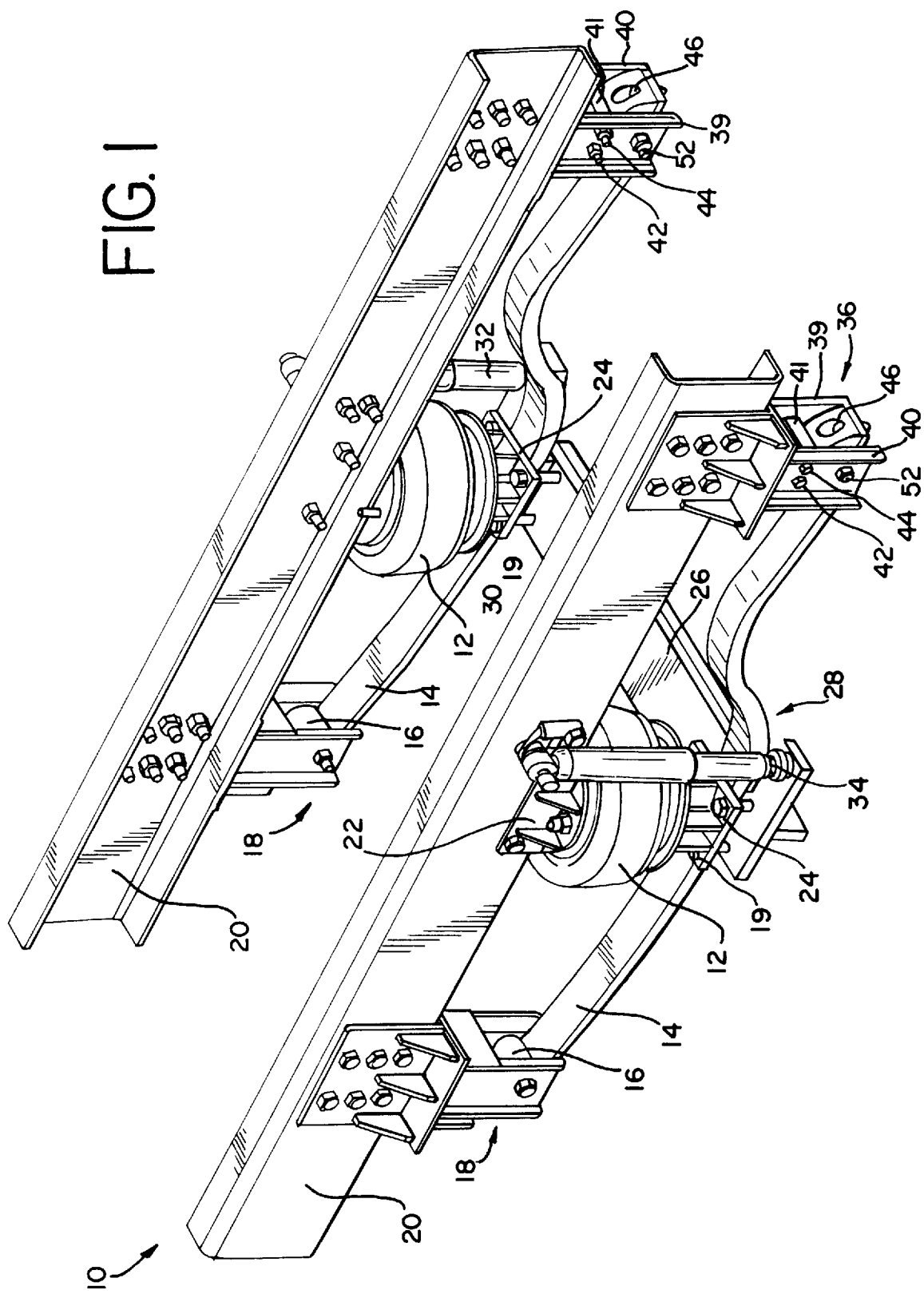
FIG. 1 is an isometric view of a suspension system for a vehicle such as a light duty truck wherein the suspension system includes the leaf spring attachment member of the present invention.

Referring to the drawings, and in particular to FIG. 1, a suspension system is shown therein and is generally designated by reference number 10. It will be seen and understood that the construction of this suspension system on one side is duplicated on the opposite side of the vehicle. The active or functional components of the suspension system 10 comprise two air springs 12—12 and two single-leaf leaf springs 14—14.

Each single-leaf leaf spring 14 is provided with an eye 16 located at the front end thereof. The eye 16 is pivotally connected to a standard or existing frame mounting bracket indicated generally by reference numeral 18. As shown, the frame mounting brackets 18 are mounted on each fore-and-aft chassis frame member 20 of the suspension system 10.

An upper air spring support bracket 22 is mounted on each chassis frame member 20 at a location that is over one end of the vehicle axle (not shown) and over the mid-portion of the single-leaf leaf spring 14 on that side. The top portion of each air spring 12 is attached to its air spring support bracket 22. The underside of each air spring 12 is mounted on an air spring support pad 24 which, in turn, is attached to an axle 26 extending from one side of suspension system 10 to the other side. As shown, the single-leaf leaf spring 14 extends between the air spring support pad 24 and the axle 26. Typically, the single-leaf leaf spring is attached to the vehicle axle by bolts 19—19.

A shock absorber generally designated at 28 is further included within suspension system 10. The shock absorber 28 is pivotally connected at its upper end to a bracket 30 mounted on frame member 20 and is attached at its bottom end to axle 26 by a fitting 34.

Figure 2:
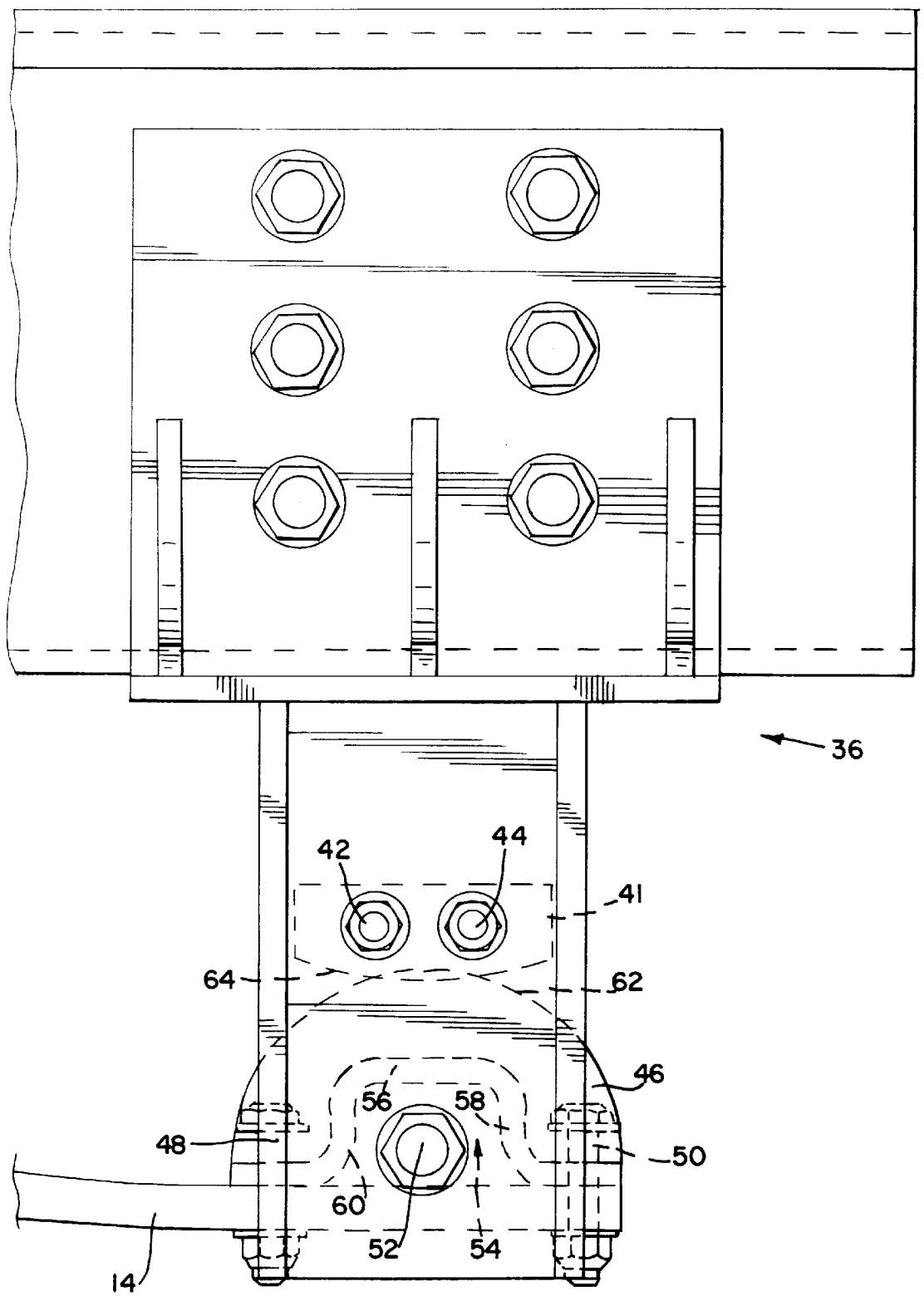
FIG. 2 is a fragmentary side elevational view taken from the outside on one side of the suspension system of FIG. 1 showing the leaf spring attachment member of the present invention.

The rear end of each single-leaf leaf spring 14 is operatively connected with a frame member 20. A mounting bracket 36 having depending inner and outer panels 39, 40 is mounted on frame member 20. A wear plate 41 (FIG. 2) is positioned between panels 39, 40 and is attached to the panels by two nut and bolt arrangements 42, 44. Moreover, a novel leaf spring attachment member 46 is fixedly mounted to the single-leaf leaf spring 14. Two nut and bolt arrangements 48, 50 provide means for mounting the leaf spring attachment member 46 to the single-leaf leaf spring 14 (FIG. 2).

During assembly of the suspension system, the single-leaf leaf spring 14 is positioned between the panels 39, 40 of bracket 36 so that a rebound bolt 52 may be connected between the panels after it is inserted through the space defined at the bottom by the top surface of the single-leaf leaf spring 14 and at the top 56 and sides 58, 60 by an interior recessed portion 54 (FIG. 2) of the leaf spring attachment member 46. Interior recessed portion 54, in turn, is defined by horizontally extending interior top wall 56 and two vertically extending interior sidewalls 58, 60 of the leaf spring attachment member 46.

In view of the above-described arrangement, those skilled in the suspension system art will appreciate that the leaf spring attachment member 46 provides advantages over the prior art systems since the attachment member permits the rear end of the single-leaf leaf spring 14 to move freely over a controlled range as fully described below. Thus, the combination of the attachment member 46 and the wear plate 41 eliminate a moving point contact on the single-leaf leaf spring and also create a bearing surface, providing a more constant spring rate for the single-leaf leaf spring 14 during operation of the suspension system 10.

Further, those skilled in the art will appreciate that use of the leaf spring attachment member 46 in a suspension system provides an additional safety feature and eliminates the practical necessity, based on safety concerns, of using a military leaf wrap. In particular, should the eye 16 of the single-leaf leaf spring 14 become detached from the mounting brackets 18, the attachment member 46 ensures that the vehicle axle will maintain a secure connection with frame member 20 through the suspension system 10.

Referring now to FIG. 2, the wear plate 41 is shown attached to the panels 39, 40 of bracket 36 by two nut and bolt arrangements 42, 44. In similar fashion, the leaf spring attachment member 46 is mounted to the rear portion of single-leaf leaf spring 14 by two nut and bolt arrangements 48, 50.

The leaf spring attachment member 46 restricts fore-and-aft, vertical and lateral movement of the single-leaf leaf spring 14 to a specific, controlled range. In particular, with respect to fore-and-aft movement, when the single-leaf leaf spring 14 moves in a forward direction, movement of the spring is restricted when the rear interior sidewall 58 of the leaf spring attachment member 46 makes contact with the rebound bolt 52. Likewise, when the single-leaf leaf spring 14 moves in a rearward direction, movement of the spring is restricted when the forward interior sidewall 60 of the leaf spring attachment member 41 makes contact with the rebound bolt 52.

With respect to vertical movement, when the single-leaf leaf spring 14 moves in an upward direction, movement of the spring is restricted when the arcuate upper surface 62 (i.e., wear surface) (FIG. 2) of the leaf spring attachment member 46 makes contact with the arcuate lower surface 64 of the wear plate 41. Similarly, when the single-leaf leaf spring 14 moves in a downward direction, movement of the spring is restricted when the interior top wall 56 of the leaf spring attachment member 46 makes contact with the rebound bolt 52.

Finally, with respect to lateral movement, movement of the leaf spring is restricted in each direction when the respective faces of the leaf spring attachment member 46 make contact with panels 39, 40.

Figure 3:
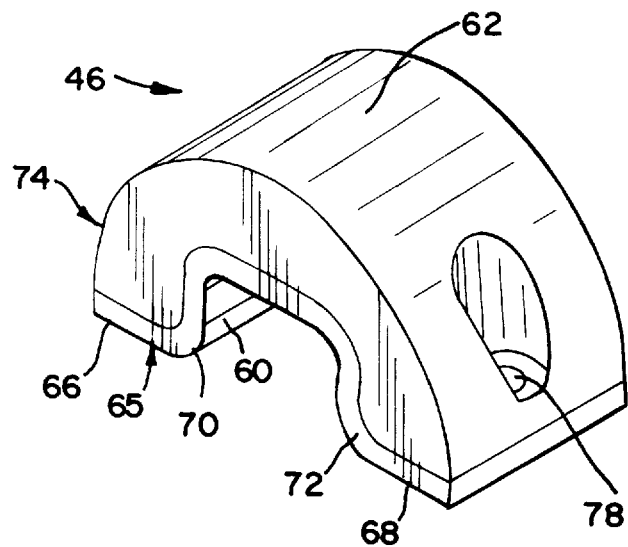
FIG. 3 is an isometric view of the leaf spring attachment member forming a component part of the present invention.
Figure 4:
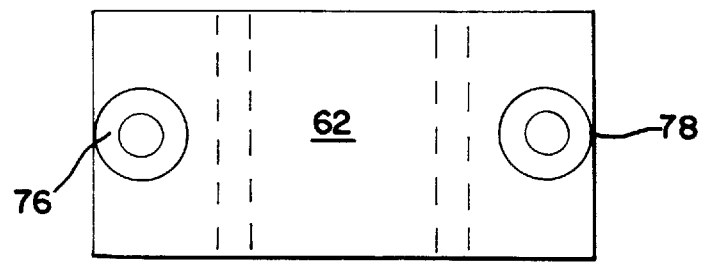
FIG. 4 is a top plan view of the novel leaf spring attachment member of the present invention.

As shown in FIG. 3, the leaf spring attachment member 46 preferably comprises a relatively thin metal or steel liner 65 which extends to form horizontally extending flange-like mounting surfaces 66, 68, arcuate surfaces 70, 72, the vertically extending interior sidewalls 58, 60, and the horizontally extending interior top wall 56 for the attachment member (FIG. 2).

A relatively thick plastic cap 74 is mounted atop the steel liner 65. The bottom surface of the plastic cap 74 is substantially identical in shape to the steel liner. However, the upper surface of the plastic cap 74 is substantially arcuate in shape in that it forms the upper surface/wear surface 62 for the leaf spring attachment member 46.

Bolt-receiving recesses 76, 78 extend through cap 74 and liner 65 of the attachment member to accommodate the nut and bolt arrangements 48, 50 (FIG. 2), thereby allowing the leaf spring attachment member 46 to be mounted to the single-leaf leaf spring 14.

Although the present invention has been described by reference to a certain preferred embodiment, it should be understood that this preferred embodiment is merely illustrative of the principles of the present invention. Therefore, modifications and/or changes may be made by those skilled in the art without departing from the true spirit and scope of the invention as defined by the appended claims.

I claim:

1. A suspension system for supporting a frame member on one side of a vehicle chassis on the adjacent end of an axle comprising:

a first frame bracket mounted to said frame member;

a second frame bracket mounted to said frame member;

a fore-and-aft extending single-leaf leaf spring having a front end and a rear end, the front end of said leaf spring being operatively connected to said first frame bracket and the rear end of said leaf spring being operatively connected to said second frame bracket;

a rebound bolt extending transversely through said second bracket;

a leaf spring attachment member mounted to said leaf spring and operatively connected with said second frame bracket, said leaf spring attachment member having an interior recessed portion providing a space of sufficient size to accommodate said rebound bolt with fore-and-aft and vertical play therebetween; and a wear plate associated with said leaf spring attachment member which is operatively connected to said second frame bracket.

2. The suspension system as defined by claim 1 wherein said leaf spring attachment member includes an arcuate upper surface and a bottom surface.

3. The suspension system as defined by claim 2 wherein said bottom surface includes a first horizontally extending flange mounting surface, a second horizontally extending flange mounting surface, a first vertically extending interior sidewall, a second vertically extending interior sidewall and a horizontally extending interior top wall.

4. The suspension system as defined by claim 3 wherein said interior top wall extends between said first interior sidewall and said second interior sidewall and is offset from said mounting surfaces.

5. The suspension system as defined by claim 3 wherein said interior top wall and said interior sidewalls define said interior recessed portion of said leaf spring attachment member.

6. The suspension system as defined by claim 1 wherein said leaf spring attachment member comprises a metal liner and a plastic cap.

7. The suspension system as defined by claim 1 wherein said leaf spring attachment member comprises a steel liner and a plastic cap.

8. The suspension system of claim 1 wherein said leaf spring attachment member is mounted to said rear end of said leaf spring.

9. The suspension system of claim 1 wherein said wear plate includes an arcuate lower surface.

10. A suspension system for supporting a frame member on one side of a vehicle chassis on the adjacent end of an axle comprising:

a first frame bracket mounted to said frame member;

a second frame bracket mounted to said frame member;

a fore-and-aft extending single-leaf leaf spring having a front end and a rear end, said front end being operatively connected to said first frame bracket and said rear end being operatively connected to said second frame bracket;

a leaf spring attachment member mounted to said leaf spring and operatively connected with said second frame bracket, said leaf spring attachment member having an arcuate upper surface and a bottom surface, the bottom surface including a first horizontally extending flange mounting surface, a second horizontally extending flange mounting surface, a first vertically extending interior sidewall, a second vertically extending interior sidewall and a horizontally extending interior top wall, said interior top wall extending between said first interior sidewall and said second interior sidewall and being offset from said mounting surfaces;

said interior top wall and said interior sidewalls defining an interior recessed portion of said leaf spring attachment member which provides a space of sufficient size to receive a rebound bolt when said leaf spring attachment member is mounted to said leaf spring; and a wear plate associated with said leaf spring attachment member, said wear plate being operatively connected to said second frame bracket.

11. The suspension system of claim 10 wherein said leaf spring attachment member includes a metal liner and a plastic cap.

12. The suspension system of claim 11 wherein said mounting surfaces and said interior recessed portion are formed by said metal liner.

13. The suspension system of claim 10 wherein said leaf spring attachment member includes a steel liner and a plastic cap.

14. The suspension system of claim 13 wherein said mounting surfaces and said interior recessed portion are formed by said steel liner.

15. The suspension system of claim 10 wherein said wear plate includes an arcuate lower surface.

16. The suspension system of claim 10 wherein said leaf spring attachment member is designed to restrict movement of said leaf spring.

17. The suspension system of claim 10 wherein said second frame bracket includes at least two panel members.

18. A suspension system for supporting a frame member on one side of a vehicle chassis on an end of an axle comprising:

a shock absorber connected between said frame member and said axle;

a first frame bracket mounted to said frame member;

a second frame bracket mounted to said frame member having first and second depending panels;

a single-leaf leaf spring having a front end and a rear end, said front end including an eye of said leaf spring, said leaf spring being connected to said first frame bracket at said eye, said rear end being operatively connected to said second frame bracket;

a leaf spring attachment member mounted to said rear end of said leaf spring, said leaf spring attachment member being operatively connected with said second frame bracket, said leaf spring attachment member having a liner and a plastic cap, said leaf spring attachment member further having an arcuate upper surface and a bottom surface, said liner of said attachment member forming said bottom surface thereof, the bottom surface including a first horizontally extending flange mounting surface, a second horizontally extending flange mounting surface, a first vertically extending interior sidewall, a second vertically extending interior sidewall and a horizontally extending interior top wall, said interior top wall extending between said first interior sidewall and said second interior sidewall and being offset from said mounting surfaces;

said interior top wall and said interior sidewalls defining an interior recessed portion of said leaf spring attachment member;

a rebound bolt connected between said first and second panels of said second frame bracket, said rebound bolt being inserted into said interior recessed portion; and a wear plate associated with said leaf spring attachment member which is connected to said second frame bracket.

19. The suspension system as defined by claim 18 wherein said liner is substantially thinner than said plastic cap.

20. The suspension system as defined by claim 18 wherein said liner is metal.

21. The suspension system as defined by claim 18 wherein said liner is steel.

22. The suspension system of claim 18 wherein said attachment member includes bolt-receiving recesses which receive means for mounting said attachment member to said leaf spring.

23. The suspension system of claim 18 wherein said wear plate includes an arcuate lower surface.

* * * * *